United States Patent [19]

Iwasaki et al.

[11] 4,003,087
[45] Jan. 11, 1977

[54] MECHANISM FOR USE IN MAGNETIC TAPE RECORDER/PLAYER

[75] Inventors: Mitsuaki Iwasaki; Hidehiro Kobayashi, both of Yokohama, Japan

[73] Assignee: Victor Company of Japan, Limited, Japan

[22] Filed: Dec. 2, 1974

[21] Appl. No.: 528,789

[30] Foreign Application Priority Data

Dec. 4, 1973  Japan ............ 48-138312[U]

[52] U.S. Cl. .................. 360/60; 360/62; 360/137; 197/98; 197/107
[51] Int. Cl.² .......................... G11B 15/04
[58] Field of Search ........... 360/60, 62, 63, 69, 360/74, 137; 197/107, 98; 74/483 PB; 200/5 B; 235/145

[56] References Cited

UNITED STATES PATENTS 2,973,664  3/1961  Williams ............ 74/483 PB
3,735,054  5/1973  Poshimura ............ 360/69

Primary Examiner—James W. Moffitt
Attorney, Agent, or Firm—Robert E. Burns; Emmanuel J. Lobato; Bruce L. Adams

[57] ABSTRACT

A record and a play keys of a magnetic tape recorder/player are depressed in order to set the recorder/player in its recording mode, and they are locked in their depressed positions by means of a first locking plate. In the above, the record key is further locked by means of a second locking plate due to the play key in its depressed position. When a stop key is depressed to stop the recording mode, the record and play keys are unlocked from the first locking plate so that the play key is released from its depressed position, and after the release of the play key, the record key is released from its depressed position.

6 Claims, 4 Drawing Figures

MECHANISM FOR USE IN MAGNETIC TAPE RECORDER/PLAYER

The present invention relates generally to a mechanism for use in a magnetic tape recorder/player, and more particularly to a mechanism for preventing a magnetic tape recorder/player from generating an undesirable electrical noise upon stopping the record operation thereof.

It is well known that, in order to set a certain type of a magnetic tape recorder/player in its recording mode, its two keys are pushbuttons, namely, a record and a play keys both are depressed to close or actuate two kinds of switches: that is, a recording-reproducing mode change switch and a muting switch for electrical and mechanical settings thereof, respectively. In apparatus of this kind, however, the following shortcoming is pointed out upon stopping the recording mode thereof, in other words, upon cutting or opening the above two switches. That is, an undesirable electrical noise is developed across monitor terminals at that time. This results from the fact that the cut of the recording-reproducing mode change switch is carried out before that of the muting switch, or at least the two switches are cut substantially at the same time. Heretofore, certain mechanisms have been developed to obviate the above mentioned defect. However, they have not found a practical use in that they are complicated in their mechanism and expensive to manufacture.

It is therefore an object of the present invention to provide an improved mechanism for use in a magnetic tape recorder/player to remove the above mentioned defect inherent to the prior art, which mechanism makes it possible to cut the recording-reproducing mode change switch after the muting switch is completely cut, when the recorder/player is released from its recording mode.

These and other objects, features and many of the attendant advantages of the present invention will be appreciated more readily as the same becomes better understood by reference to the following detailed description, when considered in connection with the accompanying drawings, wherein like parts in each of the several figures are identified by the same reference characters, and wherein:

FIG. 5 shows the manner of depressed positions of the two levers of FIG. 4, wherein the two levers are locked by one of the two locking plates of FIG. 4;

FIG. 6 shows a variation of one of the two locking plates of FIG. 4.

Figure 1:
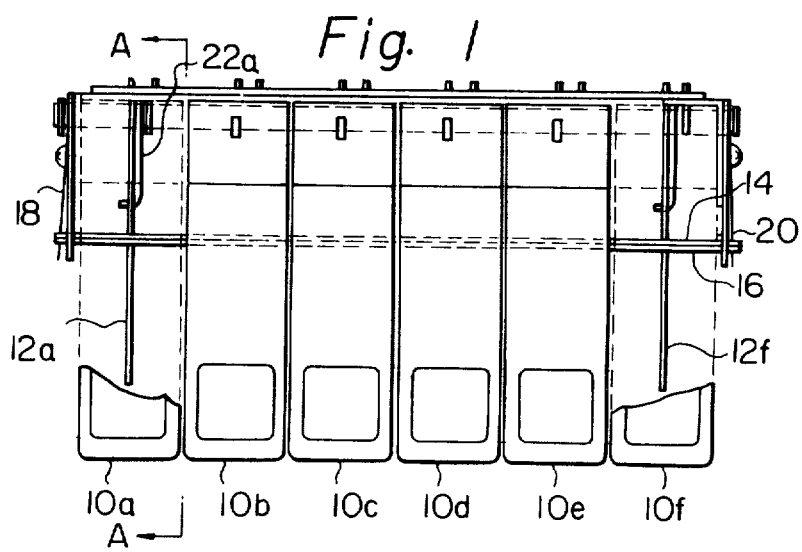
FIG. 1 shows schematically a partially cut away plan view of a keyboard assembly of a magnetic tape recorder/player in accordance with the present invention.
Figure 2:
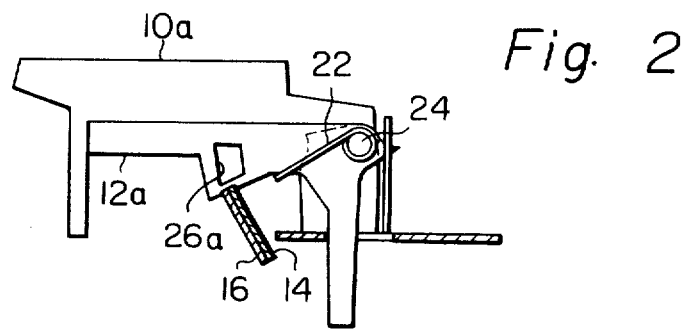
FIGS. 2 and 3 show side views taken along the line A—A in the directions of the arrows in FIG. 1, wherein one of the keys of FIG. 1 is shown in its normal and depressed positions, respectively.
Figure 3:
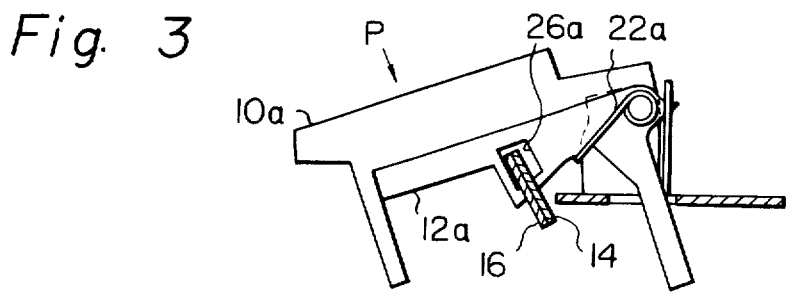
Figure 4:
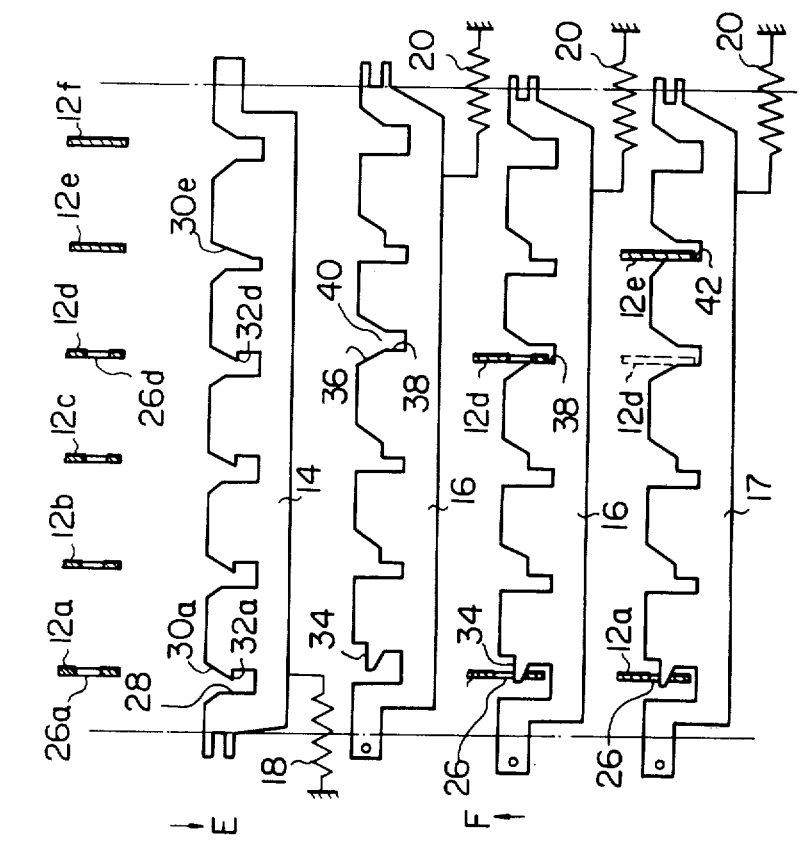
FIG. 4 shows schematically the levers and the two locking plates of the FIG. 1 assembly.

Reference is now made to FIGS. 1–3, wherein reference numerals each followed by a letter suffix, 10a, 10b, 10c, 10d, 10e, and 10f, denote six operation keys of a magnetic tape recorder/player, that is, record, rewind fast forward, play, stop, and eject keys, respectively. The record key 10a is employed to actuate or close a recording-reproducing mode change switch (not shown), whereas the play key 10d to actuate a muting switch (not shown). To set the recorder/player in its recording mode, the record and the play keys both are depressed to actuate the above two kinds of switches at the same time. On the other hand, in order to stop its recording mode, the stop key 10a is depressed to release the keys 10a and 10d from their depressed positions for opening the two switches. As previously mentioned, FIGS. 2 and 3 show side views taken along the line A—A in the direction of the arrows in FIG. 1 to more clearly illustrate the key assembly involving the record key 10a in its normal and depressed positions, respectively. The remaining key assemblies, however, are similar to that of FIGS. 2 and 3, and so their illustration will be omitted. With respect to the rewind, fast forward, and eject keys, description thereof will be omitted in that they are not concerned with the present invention. The record key 10a is fixedly connected to a lever 12a which is in turn rotatably coupled to a transversal axis 24 so as to be swung between its horizontal and depressed positions. The lever 12a is normally biased in a horizontal position by means of a wire spring 22a to make the key 10a also in its horizontal position (FIG. 2). As shown, an opening 26 is formed in the lever 12a for the purpose of locking it in a depressed position as discussed later in detail. Two locking plates 14 and 16 are transversely provided under the keyboard as shown in FIG. 1, and they are normally biased leftwards and rightwards by suitable biasing means such as spring wires 18 and 20, respectively. The locking plates 14 and 16 each has six recesses in positions corresponding respectively to levers 12a–12f as illustrated in FIG. 4. When the record key 10a is sufficiently depressed as shown in FIG. 2, the opening 26a is hooked by a latch portion 32a (FIG. 4) protruding in the recess 28 (FIG. 4). The key assemblies involving the play key 10d and the stop key 10e are similar to that of above-mentioned play key 10a, so that descriptions thereof are omitted.

Turning now to FIGS. 4 and 5, there is illustrated in detail an improved mechanism according to the present invention. In order to cause the recorder/player in question to be in the record mode, first, the levers 12a is depressed in a direction as indicated by an arrow E. As shown, the latch plate 14 is biased leftwards by means of the spring wire 18 of FIG. 4 such that a slant portion 30a initially engages the lowermost end of the lever 12a upon depression of the lever 12a. The lever 12a, when depressed, engages the slant portion 30a to slightly shift the locking plate 14 toward the right, and if further depressed, it is finally locked at the opening 26a by a latch portion 32a protruding into the recess 28. Second, the lever 12d is depressed to be locked in its depressed position by the locking plate 14 in the same manner as described in connection with the lever 12a. However, it is to be noted in this case that until the completion of the locking of the lever 12d, the lever 12a is continued to be pressed down, with a finger for example, so as not to be released due to the rightward shift of the locking plate 14 during the depressing operation of the lever 12d. In the above, the following engagement of the lever 12a with the other locking plate 16 is performed. That is, the lever 12d initially engages a slant portion 36 of the locking plate 16 and then a surface 38 thereof to shift it leftwards against the spring wire 20, so that a latch portion 34 of the locking plate 16 also moves leftwards to mesh with the opening 26a of the lever 12a. As a result, the lever 12a is further locked by the plate 16 as well as the plate 14.

In FIG. 5, there are shown the locking plate 16 together with the levers 12a and 12d in their depressed positions. Thus, the magnetic tape recorder/player is ready for recording. Then, in order to stop the recording mode of the recorder/player, the lever 12e, which is fixedly attached to the stop key 10e, is depressed to release the levers 12a and 12d from their depressed positions. The manner of the releasing operations of the levers 12a and 12d is as follows. The lever 12e, when depressed, engages a slant portion 30e of the locking plate 14 to shift the plate 14 rightwards, resulting in disengaging the latch portions 32a and 32d from the opening 26a and 26d, respectively. Consequently, the lever 12d is at first hand released from its depressed position, and then after a while the lever 12a is released to hop up to its normal position because the lever 12a can be completely released only when the lever 12d is released to jump up to some extent which is determined by the configuration of the recess 40.

It is clearly understood from the above that the recording-reproducing mode change switch is surely cut or opened only after the cut of the muting switch. Consequently, the above mentioned undesirable noise, which is generated across the monitor terminals upon cutting the former switch in the conventional apparatus, is completely prevented.

In FIG. 6, there is illustrated another locking plate 17, which is a variation of the locking plate 16, together with the levers 12a, 12d and 12e in their depressed positions. The difference between the locking plates 16 and 17 resides in the fact that the latter remains shifted leftwards to continue locking the lever 12a in its depressed position as long as the lever 12e is depressed as shown in FIG. 6. The locking plate 17 is held in the shifted position in that the lever 12e engages a surface 42 of the plate 17 against the force of the spring 20. Therefore, the lever 12a can be released to jump up to its normal or horizontal position only when the lever 12e is allowed to shift upwards by predetermined distance. This means that whether or not the lever 12a is released from its depressed position is under the will of the operator.

Consequently, it is quite apparent that the recording-reproducing mode change switch is cut after the cut of the muting switch, resulting in preventing the undesirable noise as discussed in the former embodiment of the present invention.

In the above, it is to be noted that the number of the keys shown in FIG. 1 is not limited to six, and that the key and the lever can be united in one.

From the above, it is apparent that the mechanism of this invention for use in the magnetic tape recorder/player is sure to cut or open in sequence the muting and the recording-reproducing mode change switches of the recorder/player upon stopping the record operation thereof. As a result, the drawback inherent to the prior art is completely removed.

What is claimed is:

1. A mechanism comprising:
   a keyboard including a first key, a second key and a third key;
   a first locking plate yieldingly urged to a locking position wherein said first and second keys can be held in their depressed positions when they are depressed, said first locking plate having a surface engaging with said third key such that upon depression of said third key, said first locking plate shifts to an unlocking position wherein said first and second keys are released; and
   second locking plate yieldingly urged to a locking position wherein said first key can be further held in the depressed position thereof when said second key is depressed, said second locking plate having a surface engaging with said second key such as to be held in said locking position thereof as long as said second key is depressed.

2. A mechanism claimed in claim 1, wherein said first and second locking plates are positioned substantially in parallel with each other under said keyboard and biased in the opposite directions by means of biasing means, said first locking plate having at least two latch portions for holding said first and second keys, whilst said second locking plate has at least one latch portion for holding said first key, said first key being fixedly attached to a plate member which has an engaging portion to be locked in a depressed position by said first and second locking plates, said second key being fixedly attached to a plate member which has an engaging portion to be locked in a depressed position by said first locking plate, and the plate members being rotatably connected to a transversal axis positioned substantially in parallel with said first and second locking plates under said keyboard.

3. A mechanism claimed in claim 1, wherein said second locking plate further comprises another surface engaging with said third key such that said second locking plate is held in said locking position as long as said third key is depressed.

4. A mechanism for use in a magnetic tape recorder/player including a first key for actuating a recording-reproducing mode change switch, a second key for actuating a muting switch and a third key for stopping record operation of the recorder-player, said mechanism comprising:
   a first locking plate yieldingly urged to a locking position wherein said first and second keys can be locked in their depressed positions when they are depressed, said first locking plate having a surface engaging with said third key such that upon depression of said third key, said first locking plate shifts to an unlocking position wherein said first and second keys are released; and
   second locking plate yieldingly urged to a locking position wherein said first key can be further locked in the depressed position thereof when said second key is depressed, said second locking plate having a surface engaging with said second key such as to be held in said locking position thereof as long as said second key is depressed.

5. A mechanism for use in a magnetic tape recorder/player claimed in claim 4, wherein said first and second locking plates are positioned substantially in parallel with each other under each keyboard and biased in the opposite directions by means of biasing means, said first locking plate having at least two latch portions for holding said first and second keys, whilst said second locking plate has at least one latch portion for holding said first key, said first key being fixedly attached to a plate member which has an engaging portion to be locked in a depressed position by said first and second locking plates, said second key being fixedly attached to a plate member which has an engaging portion to be locked in a depressed position by said first locking plate, and the plate members being rotatably connected to a transversal axis positioned substantially in parallel with said first and second locking plates under said keyboard.

6. A mechanism for use in a magnetic tape recorder-player claimed in claim 4, wherein said second locking plate further comprises another surface engaging with said third key such that said second locking plate is held in said locking position as long as said third key is depressed.

* * * * *